US008112404B2

(12) United States Patent
Huynh et al.

(10) Patent No.: US 8,112,404 B2
(45) Date of Patent: Feb. 7, 2012

(54) PROVIDING SEARCH RESULTS FOR MOBILE COMPUTING DEVICES

(75) Inventors: Tuan Huynh, Tokyo (JP); Hiromi Kobayashi, Tokyo (JP); Takeshi Tanaka, Tokyo (JP); Hirokazu Sawada, Tokyo-to (JP); Tsutomu Kagoshima, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 12/116,962

(22) Filed: May 8, 2008

(65) Prior Publication Data
US 2009/0281991 A1 Nov. 12, 2009

(51) Int. Cl.
*G06F 7/00* (2006.01)
*G06F 17/30* (2006.01)

(52) U.S. Cl. .......................... 707/705; 707/710; 707/731

(58) Field of Classification Search .................. 707/705, 707/706, 722, 723, 731, 709, 710
See application file for complete search history.

(56) References Cited

U.S. PATENT DOCUMENTS

| | | | |
|---|---|---|---|
| 6,718,333 B1 * | 4/2004 | Matsuda ........................ 715/234 |
| 7,693,902 B2 * | 4/2010 | Kim et al. ........................ 707/731 |
| 7,840,579 B2 * | 11/2010 | Samuelson et al. ............ 707/758 |
| 7,844,594 B1 * | 11/2010 | Holt et al. ...................... 707/709 |
| 2003/0225755 A1 | 12/2003 | Iwayama et al. |
| 2006/0271520 A1 * | 11/2006 | Ragan ............................. 707/3 |
| 2007/0027839 A1 | 2/2007 | Ives |
| 2007/0061303 A1 | 3/2007 | Ramer et al. |
| 2007/0067272 A1 | 3/2007 | Flynt et al. |
| 2007/0067305 A1 | 3/2007 | Ives |
| 2007/0099636 A1 | 5/2007 | Roth |
| 2007/0174299 A1 | 7/2007 | Kuang et al. |
| 2007/0208704 A1 | 9/2007 | Ives |
| 2008/0319947 A1 * | 12/2008 | Latzina et al. ................... 707/3 |
| 2009/0106200 A1 * | 4/2009 | Salinas et al. .................... 707/3 |

FOREIGN PATENT DOCUMENTS

| | | |
|---|---|---|
| CN | WO2007118424 A1 | 10/2007 |
| KR | 10-2006-0107952 A | 10/2006 |
| WO | WO 2006-096838 | 9/2006 |

OTHER PUBLICATIONS

Jones, et al. "Using Keyphrases as Search Result Surrogates on Small Screen Devices", Feb. 2004, vol. 8, No. 1, Personal and Ubiquitous Computing, pp. 1-32.
Käki, "Enhancing Web Search Result Access with Automatic Categorization", Academic Dissertation in Dissertations in Interactive Technology, Department of Computer Sciences, University of Tampere, Dec. 2, 2005, pp. 167.
International Search Report dated Dec. 3, 2009 in International Application No. PCT/US2009/041866. Kamvar et al., "A Large Scale Study of Wireless Search Behavior: Google Mobile Search," Apr. 2006, Conference on Human Factors in Computing Systems (CHI '06), pp. 701-709.
Xie et al., "Efficient Browsing of Web Search Results on Mobile Devices Based on Block Importance Model," Mar. 2005, 3$^{rd}$ IEEE International Conference on Pervasive Computing and Communications (PERCOM '05), pp. 17-26.

* cited by examiner

*Primary Examiner* — Don Wong
*Assistant Examiner* — Merilyn Nguyen
(74) *Attorney, Agent, or Firm* — Hope Baldauff Hartman, LLC (57) ABSTRACT

Search results are provided for mobile computing devices. Search results are retrieved based on a search term. Each of the search results is assigned to one or more categories. The categories and the assigned search results are provided to the mobile computing device. The mobile computing device is adapted to display each of the categories and a partial list of the search results for each of the categories.

18 Claims, 5 Drawing Sheets

PROVIDING SEARCH RESULTS FOR MOBILE COMPUTING DEVICES

BACKGROUND

In recent years, technology has advanced to a level that mobile computing devices, such as mobile phones, smartphones, personal digital assistants ("PDAs"), and the like, are now capable of executing computer applications that were previously reserved for desktop computers, laptop computers, and other full-sized computing devices. In particular, the physical size of processors and memory has significantly reduced, while the processing power of processors and the storage capacity of memory have significantly increased. Many mobile computing devices are also capable of accessing remote networks over a local area network ("LAN"), the Internet, and other suitable network. Examples of computer applications that may be executed by mobile computing devices include web browser applications for surfing the web, office productivity applications for creating, viewing, and editing a variety of documents, and email applications for sending and receiving emails.

Even though mobile computing devices have increased processing power and memory capacity, certain limitations of mobile computing devices have remained relatively constant. To account for these limitations, software developers commonly design separate versions of computer applications for mobile computing devices and full-sized computing devices. One limitation of mobile computing devices is screen size. A typical full-sized computing device may include a display that is twelve inches (diagonally) or greater, while a typical mobile computing device may include a display that is three and half inches (diagonally) or smaller. With full-sized computing devices, computer applications can be designed with sophisticated graphical user interfaces that include a larger amount of text and interface elements (e.g., menus, frames, buttons, etc.). In contrast, with mobile computing devices, computer applications are usually designed with streamlined interfaces that include a reduced amount of text and interface elements. By reducing the amount of information displayed on the screen at any given time, the information can be presented at a size that is readable by most users.

Another limitation of mobile computing devices is the input interface. Many full-sized computing devices include at least a full-sized keyboard and a pointing device, such as a mouse. The full-sized keyboard enables users to easily input large amounts of text, and the pointing device enables users to navigate the graphical user interface provided by a computer application. In contrast to full-sized computing devices, many mobile computing devices lack a full-sized keyboard and/or a pointing device. For example, some mobile computing devices include a reduced keyboard in which multiple keys on the full-sized keyboard are mapped to single keys on the reduced keyboard in order to reduce the total number of keys on the reduced keyboard. A single keystroke on a full-sized keyboard may correspond to a multiple keystroke combination on the reduced keyboard.

Instead of a pointing device, some mobile computing devices include a directional pad and selection button. The directional pad enables users to navigate up, down, left, and right across a graphical user interface, and the selection button enables to select portions of the graphical user interface that are selectable. While the directional pad and selection button provide a way to navigate the graphical user interface, the directional pad and selection button do not provide the ease of use provided by pointing devices, such as a mouse.

A number of computer applications provide a search interface and corresponding search engine enabling users to search for information in a variety of databases. In a conventional search interface, an exhaustive list of search results can be provided to users under the assumption that the users have access to a larger display and an adequate input device. However, such an approach is suboptimal for mobile computing devices with a smaller display and an inferior input device. In particular, the smaller screen size of mobile computing devices may restrict the number of search results that can be displayed at a given time. Further, the inferior input devices of many mobile computing devices increase the difficulty in which users can navigate through the exhaustive list.

It is with respect to these considerations and others that the disclosure made herein is presented.

SUMMARY

Technologies are described herein for providing search results for mobile computing devices. In particular, through the utilization of the technologies and concepts presented herein, a server computer may include a search engine that is adapted to receive, from a mobile computing device over a network, a request to perform a search based on a search term. The search engine may retrieve search results by querying one or more local and/or remote databases based on the search term. Upon retrieving the search results, the search engine may assign each of the search results to one or more categories relevant to the search results. Upon assigning each of the search results to one or more categories, the search engine may transmit, to the mobile computing device over the network, the categories and the assigned search results.

The mobile computing device may include an improved search interface adapted to receive the categories and the assigned search results, and to display each of the categories and a partial list of search results under each of the categories. For example, the partial list of search results may include three search results under each of the categories or other suitable number. The improved search interface may also be adapted to display a link under each of the categories. The links may be selectable to display a full list of search results for each of the categories. That is, the links enable a user of the mobile computing device to drill down into each of the categories to view only corresponding search results as necessary.

According to one aspect presented herein, a computer program is provided for providing search results for mobile computing devices. The computer program retrieves search results based on a search term. Each of the search results are assigned to one or more categories. Upon assigning the search results to one or more categories, the computer program provides the categories and the search results to the mobile computing device. The mobile computing device is adapted to display each of the categories and a partial list of the search results for each of the categories.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing search results for mobile computing devices. Through the utilization of the technologies and concepts presented herein, a server computer includes a search engine that is adapted to receive, from a mobile computing device over a network, a request to perform a search based on a search term. The search engine may retrieve search results by querying one or more local and/or remote databases based on the search term. Upon retrieving the search results, the search engine may assign each of the search results to one or more categories relevant to the search results. Upon assigning each of the search results to one or more categories, the search engine may transmit, to the mobile computing device over the network, the categories and the assigned search results.

The mobile computing device may include an improved search interface adapted to receive the categories and the assigned search results, and to display each of the categories and a partial list of search results under each of the categories. For example, the partial list of search results may include three search results under each of the categories or other suitable number. The improved search interface may also be adapted to display a hyperlink ("link") under each of the categories. The links may be selectable to display a full list of search results for each of the categories. That is, the links enable a user of the mobile computing device to drill down into each of the categories to view only corresponding search results as necessary.

The improved search interface described in embodiments herein provides an optimal way to display search results on mobile computing devices, taking into account their limitations, such as a smaller screen size and inferior input devices. Instead of displaying an exhaustive list of search results, as is commonly found on conventional search interfaces, the improved search interface reduces the total number of search results displayed by displaying categories of search results and only a partial list of search results under each of the categories. By displaying the search results in this manner, a user viewing the search results can easily narrow the displayed search results to only relevant search results. This reduces the potential number of selections (e.g., "clicks") of a suitable input device for the user to retrieve the desired search result.

For example, a user may desire to search an intranet-accessible server for an office productivity file. Instead of displaying an exhaustive list of files for the user to navigate, the improved search interface displays categories, such as a word processing file category, a spreadsheet file category, and a presentation file category. Under each of these categories may be a partial list of the files corresponding to the given category and a link selectable by the user to access a full list of files corresponding to the given category. If the user is aware that the file for which she is searching is a spreadsheet file, then the user can select the link under the spreadsheet file category to view only the spreadsheet files. This may reduce the number of files that the user traverses to find the desired file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
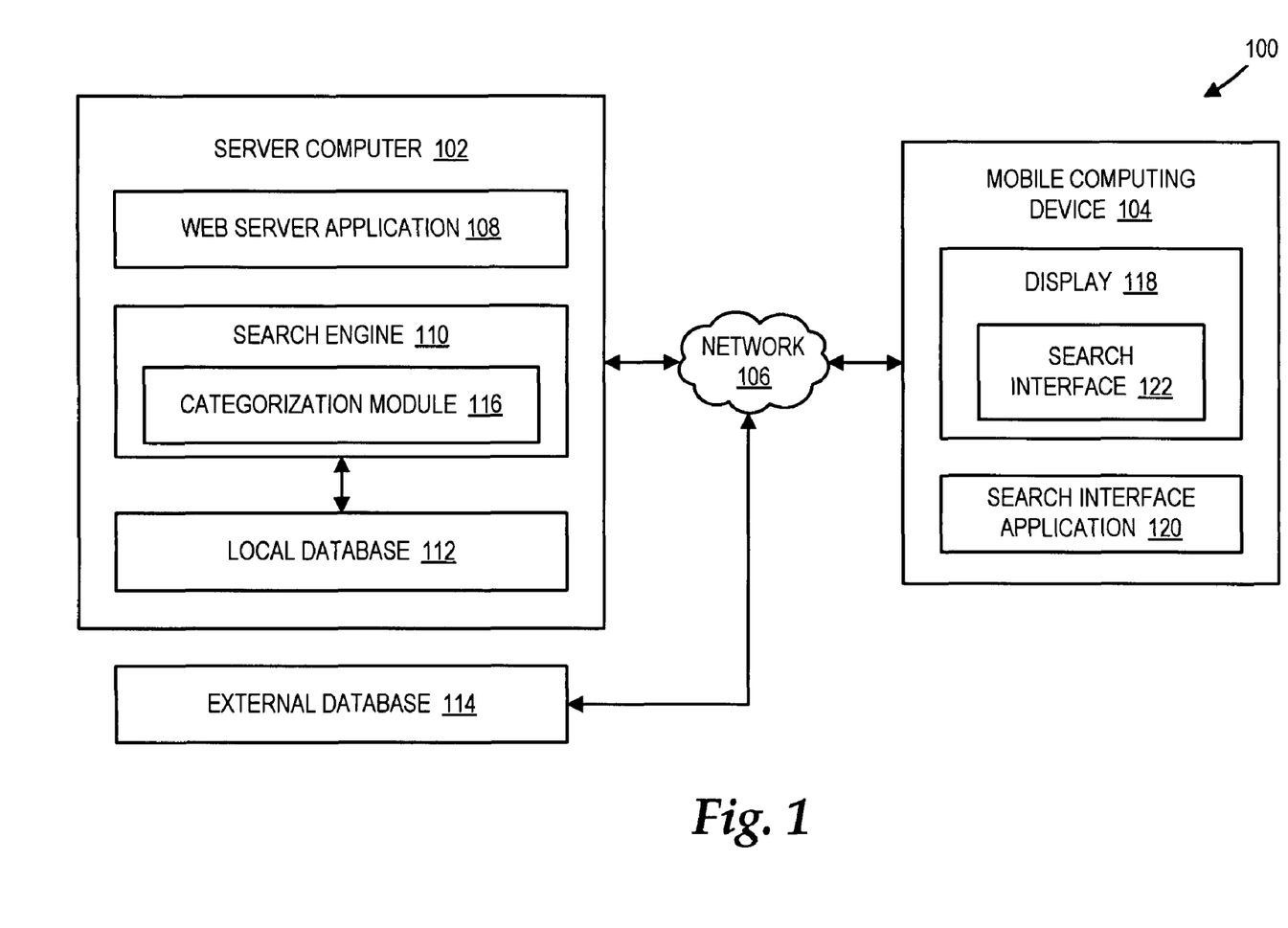
FIG. 1 is a network architecture diagram showing aspects of a network architecture capable of providing search results for mobile computing devices, in accordance with one embodiment.

In the following detailed description, references are made to the accompanying drawings that form a part hereof, and which are shown by way of illustration specific embodiments or examples. Referring now to the drawings, in which like numerals represent like elements through the several figures, FIG. 1 shows aspects of a simplified network architecture for categorizing search results and displaying the categorized search results on a mobile computing device. In particular, FIG. 1 illustrates a simplified network architecture 100 including a server computer 102 and a mobile computing device 104 operatively coupled to the server computer 102 via a network 106. The network 106 may be any suitable computer network, such as a local area network ("LAN") or the Internet. The network 106 may be a private computer network, such as an intranet, or a publicly accessible computer network. Although only one mobile computing device 104 is illustrated in FIG. 1, the network architecture 100 may include multiple mobile computing devices in any suitable network configuration.

As shown in FIG. 1, the server computer 102 includes a web server application 108 and a search engine 110. The web server application 108 enables communication between the server computer 102 and the mobile computing device 104. In particular, the web server application 108 enables the mobile computing device 104 to access the search engine 110 via the network 106. The web server application 108 may be an intranet web server application or other suitable web server application. In one embodiment, the search engine 110 is adapted to receive one or more search terms from the mobile computing device 104 via the network 106, and to retrieve one or more search results based on the search terms. The search engine 110 may retrieve the search results from a local database 112 within the server computer 102, a remote database 114 via the network 106. The remote database 114 may be part of an email server, for example, that stores emails and other relevant data, such as contact information, about users within an organization. Examples of email servers include EXCHANGE SERVER from MICROSOFT CORPORATION, GROUPWISE from NOVELL INC., and LOTUS DOMINO from INTERNATION BUSINESS MACHINES CORPORATION. The search engine 110 may perform searches on the local database and the remote database 114 via standard query language ("SQL") or other suitable database search technique.

The search engine 110 may be adapted to search for any suitable information in the local database 112 and/or the remote database 114 as contemplated by those skilled in the art. In one example, the search engine 110 is adapted to search for documents in the local database 112 and/or the remote database 114. Examples of documents may include, but are not limited to, word processing documents, spreadsheet documents, and presentation documents. In this case, a search term may be a portion of the file name, a portion of the file author's name, or a portion of the text within the document. In another example, the search engine 110 is adapted to search a sales inventory to determine whether a given product is in stock. In this case, a search term may be a name of the product or a serial number associated with the product.

Upon receiving a plurality of search results from the local database 112 and/or the remote database 114, a categorization module 116 assigns each of the plurality of search results into one or more categories. In one embodiment, the categories include predefined categories created and managed by an organization operating the search engine 110. In particular, an organization can add, delete, and modify categories as necessary. In one example, if documents are searched, the categories may include different document types. Thus, a word processing document may be assigned to word processing document category, a spreadsheet document may be assigned to a spreadsheet document category, and a presentation document may be associated to a presentation document category. In another example, if emails are searched, the categories may include a sender name, a recipient name, and an email date. In yet another example, if contact information of employees within an organization is searched, the categories may a name, a phone number, an address, and a birthday. Categories may also be based on the source. For example, if search results are retrieved from multiple local and/or remote databases, then each of the local and/or remote databases may be separate category. Other suitable categories in which to divide the search results into more manageable groups may be utilized as contemplated by those skilled in the art.

As illustrated in FIG. 1, the mobile computing device 104 includes a display 118 and a search interface application 120. Examples of mobile computing devices, such as the mobile computing device 104, may include, but are not limited to, mobile phones, smartphones, PDAs, and the like. The display 118 on the mobile computing device 104 is significantly smaller than the displays on full-sized computing devices. For example, the display 118 may be three and half inches (diagonal) or less, while a display for a full-sized computing device may be twelve inches or greater. The search interface application 120 may be a computer application that, when executed by a processor, causes the mobile computing device 104 to display a search interface 122 within the display 118.

In one embodiment, the search interface 122 is adapted to enable a user to input one or more search terms for searching the local database 112 and/or the remote database 114 via the search engine 110. The search interface 122 is further adapted to display search results in a smaller display, such as the display 118. Once the search engine 110 has retrieved search results from the local database 112 and/or the remote database 114 and the categorization module 116 has assigned the search results to one or more categories, the search engine 110 may transmit the categories and the assigned search results to the mobile computing device 104 via the network 106. Upon receiving the categorized search results, the search interface 122 may display the categories associated with the search results. The search interface 122 may also display at least a partial list of the search results and a link under each of the categories. The links may be selectable by a user via a suitable input device on the mobile computing device 104 to access a full list of the search results for each of the categories.

Figure 2:
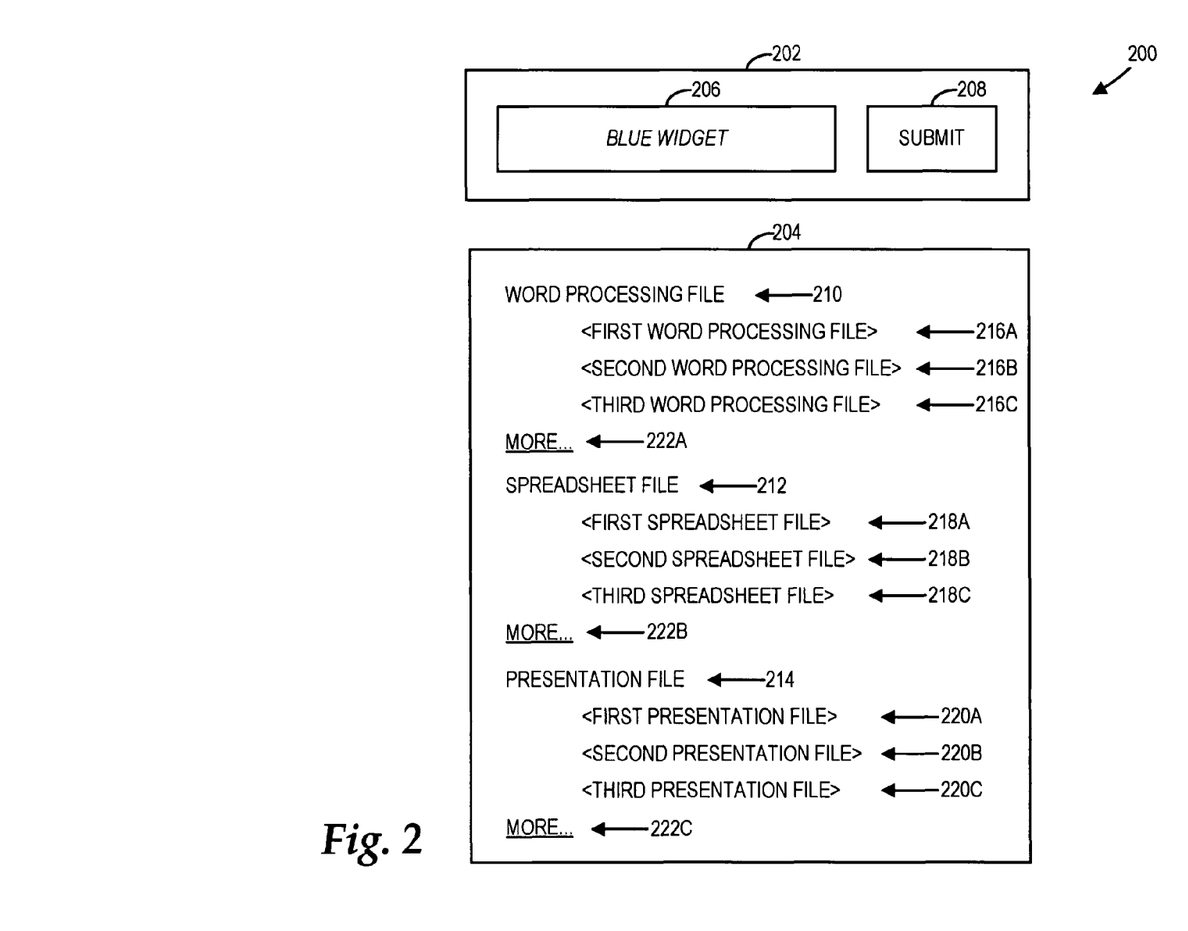
FIG. 2 is a screen display diagram showing an illustrative screenshot of an implementation of a search interface, in accordance with one embodiment.

Referring now to FIG. 2, aspects of a search interface adapted to enable a user to input a search term and display search results based on the search term on a mobile computing device. In particular, FIG. 2 illustrates a screenshot of 200 an exemplary implementation of the search interface 122. The screenshot 200 includes a search term entry 202 and a search result display 204. The search term entry 202 includes an entry window 206 which enables a user to input one or more search terms. Upon entering the search terms into the entry window 206, the user may select a submit button 208 via a suitable input device on the mobile computing device 104. In one embodiment, selecting the submit button 208 instructs the mobile computing device 104 to transmit to the server computer 102 a request to retrieve search results based on the search terms entered in the entry window 206. Upon receiving the search terms from the mobile computing device 104, the search engine 110 retrieves search results from the local database 112 and/or the remote database 114 by querying the local database 112 and/or the remote database 114 based on the search terms.

Once the search results are retrieved, the categorization module 116 may assign the search results to one or more predefined categories. In one embodiment, the categories are defined by an enterprise operating the search engine 110. Upon assigning the search results to categories, the categorization module 116 transmits the categories and the assigned search results to mobile computing device 104. The search interface application 120 may display the categories in the search interface 122. The search interface application 120 may also display a partial list of search results for each of the categories and a link for each of the categories. The link may be selectable by a user via a suitable input device on the mobile computing device 104 to display a full list of search results for each of the categories.

In an illustrative example, a user has entered "blue widget" in the search term entry 202, as illustrated in FIG. 2. Once the user selects the submit button 208, the search interface application 120 transmits a request to retrieve search results from the local database 112 and/or the remote database 114 based on the search term "blue widget." Upon receiving the request, the search engine 110 retrieves a plurality of search results based on the search term "blue widget." The categorization module 116 assigns the plurality of search results to one or more predefined categories.

In the illustrative example, the search results are documents that contain the term "blue widget." In this case, the categories may be the file type, such as a word processing file type, a spreadsheet file type, or a presentation file type, associated with each of the documents. Once the categorization module 116 assigns each of the documents retrieved by the search engine 110 to the word processing document category, the spreadsheet document category, or the presentation document category, the search engine 110 transmits the categorized search results to the search interface application 120, which displays the categorized search results in the search result display 204 of the search interface 122.

As illustrated in FIG. 2, the search interface application 120 displays a word processing file category 210, a spreadsheet file category 212, and a presentation file category 214. Under each of the categories 210-214 is a list of three search results associated with the corresponding category. Under the word processing file category 210 is a first word processing file 216A, a second word processing file 216B, and a third word processing file 216C. Under the spreadsheet file category 212 is a first spreadsheet file 218A, a second spreadsheet file 218B, and a third spreadsheet file 218C. Under the presentation file category 214 is a first presentation file 220A, a second presentation file 220B, and a third presentation file 220C.

Instead of displaying an exhaustive list of search results as in conventional search interfaces, the search interface 122 described in embodiments herein displays categories of search results and a partial list corresponding search results. As such, the search interface 122 is appropriate for smaller displays, such as the display 118, that is are found on mobile computing devices. It should be appreciated that the list of three search results for each of the categories 210-214 is merely exemplary and any number of search results may be listed in other implementations.

Figure 3:
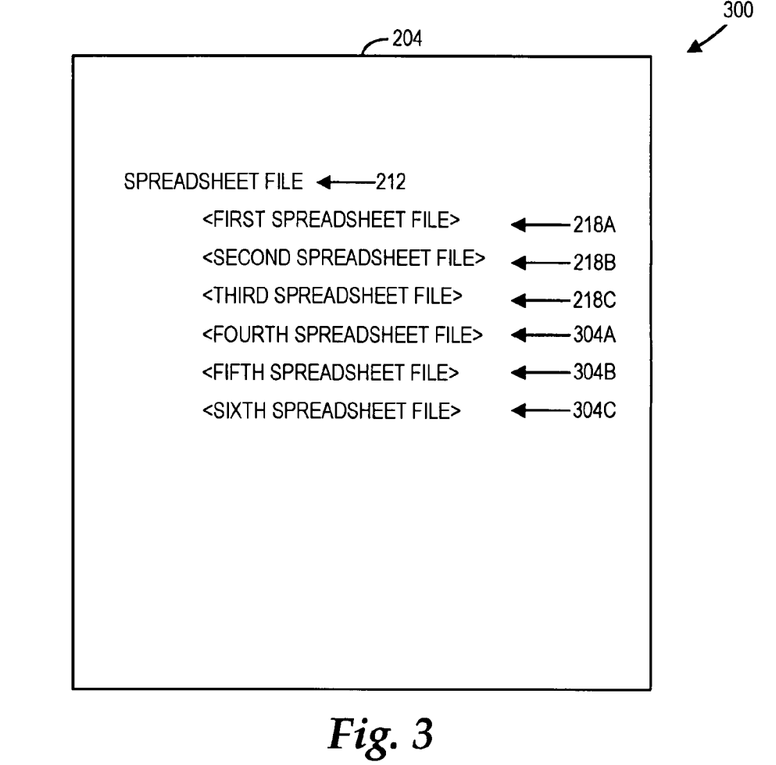
FIG. 3 is a screen display diagram showing an illustrative screenshot of an implementation of a search result display, in accordance with one embodiment.

Under the word processing file category 210, the spreadsheet file category 212, and the presentation file category 214 is first link 222A, a second link 222B, and a third link 222C, respectively. Each of the links 222 may be selected by a user via a suitable input device on the mobile computing device 104 to display a full list of search results for the corresponding categories 210-214. For example, FIG. 3 shows a screenshot 300 of the search result display 204 once a user selects the second link 222B. As illustrated FIG. 3, the screenshot 300 displays the spreadsheet files 218 displayed in FIG. 2. Additionally, the screenshot 300 displays a fourth spreadsheet file 304A, a fifth spreadsheet file 304B, and a sixth spreadsheet file 304C.

Figure 4:
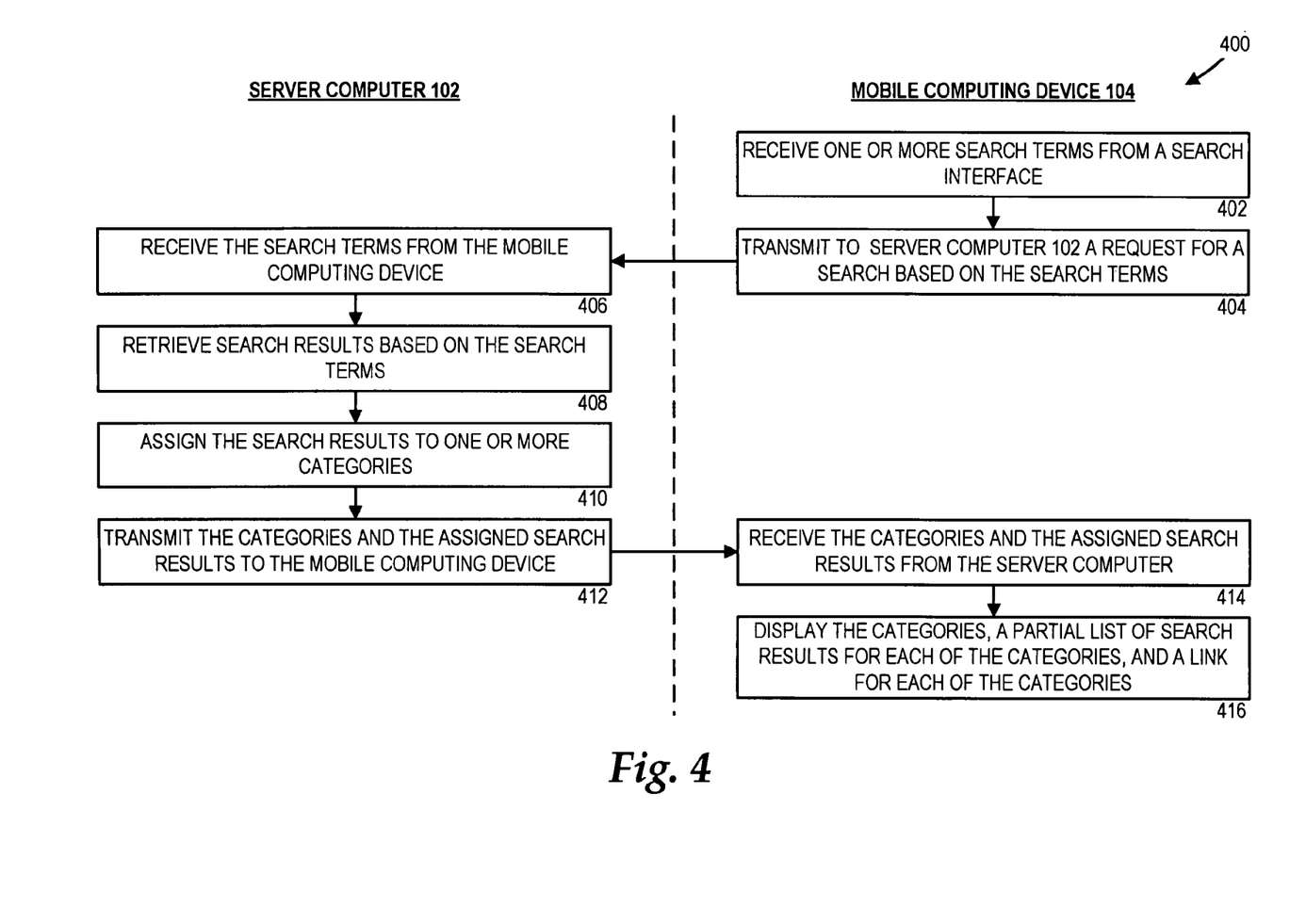
FIG. 4 is a flow diagram showing an illustrative process for providing search results for mobile computing devices, in accordance with one embodiment.

Turning now to FIG. 4, additional details will be provided regarding the search engine 110 and the categorization module 116. In particular, FIG. 4 is a flow diagram illustrating aspects of one method provided herein for providing search results to a mobile computing device, such as the mobile computing device 104. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 4, a routine 400 begins at operation 402, where the mobile computing device 104 receives one or more search terms input by a user. For example, the user may input search terms into the search interface 122. The routine 400 proceeds to operation 404, where the mobile computing device 104 transmits over the network 106 to the server computer 102 a request to retrieve search results based on the search terms. Once the mobile computing device 104 transmits the search terms to the server computer 102, the routine 400 proceeds to operation 406.

At operation 406, the server computer 102 receives from the mobile computing device 104 over the network 106 the request to retrieve search results based on the search terms. The routine 400 proceeds to operation 408, where the server computer 102 retrieves the search results by querying one or more local databases and/or remote databases based on the search terms. For example, the search engine 110 may query the local database 112 and/or the remote database 114. The routine 400 proceeds to operation 410, where the server computer 102 assigns the search results to one or more categories. The categories may be created and maintained by an organization operating the search engine 110. In this way, the user is removed from the responsibility of creating and managing the categories. Further, categories can be easily added, deleted, and modified. The routine 400 proceeds to operation 412, where the server computer 102 transmits to the mobile computing device 104 over the network 106 the categories and the assigned search results. Once the server computer 102 transmits the categories and the assigned search results, the routine 400 proceeds to operation 414.

At operation 414, the mobile computing device 104 receives from the server computer 102 over the network 106 the categories and the assigned search results. The routine 400 proceeds to operation 416, where the mobile computing device 104 displays the categories and a partial list of the search results under each of the categories. Also displayed under each of the categories is a link selectable to view the full list of the corresponding search results for that category.

Figure 5:
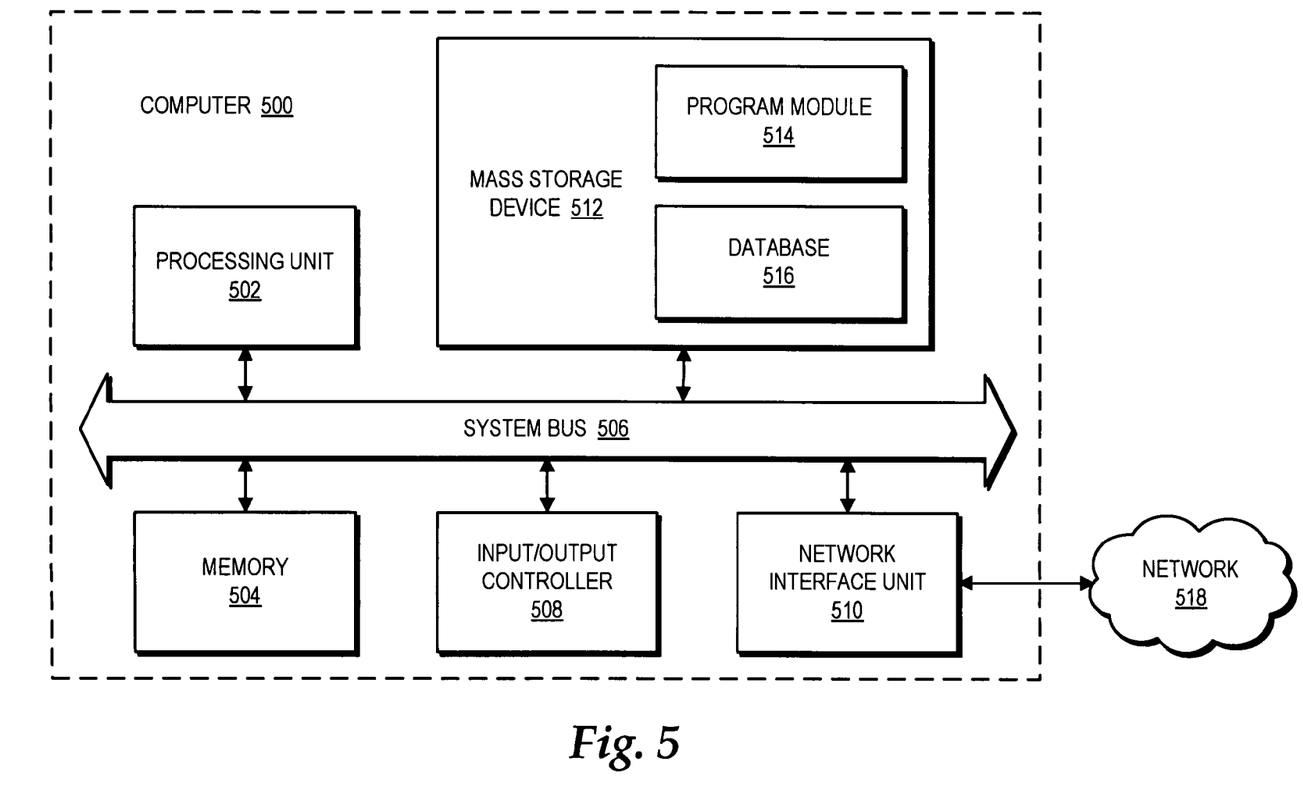
FIG. 5 is a computer architecture diagram showing aspects of an illustrative computer hardware architecture for a computing system capable of implementing aspects of the embodiments presented herein.

Referring now to FIG. 5, an exemplary computer architecture diagram showing aspects of a computer 500 is illustrated. Examples of the computer 500 may include the server computer 102 and the mobile computing device 104. The computer 500 includes a processing unit 502 ("CPU"), a system memory 504, and a system bus 506 that couples the memory 504 to the CPU 502. The computer 500 further includes a mass storage device 512 for storing one or more program modules 514 and one or more databases 516. Examples of the program modules 514 may include the web server application 108, the search engine 110, the categorization module 116, and the search interface application 120. Examples of the databases 516 may include the local database 112 and the remote database 114. The mass storage device 512 is connected to the CPU 502 through a mass storage controller (not shown) connected to the bus 506. The mass storage device 512 and its associated computer-readable media provide nonvolatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 518. The computer 500 may connect to the network 518 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

Based on the foregoing, it should be appreciated that technologies for providing search results for mobile computing devices are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing search results to a mobile computing device, the method comprising:
   receiving, at a search server computer, a user-provided search term from the mobile computing device via a communications network;
   retrieving, by the search server computer, search results based on the user-provided search term received from the mobile computing device;
   assigning, by the search server computer, each of the search results to one or more categories; and
   upon assigning each of the search results to the one or more categories, providing the one or more categories and the search results from the search server computer to the mobile computing device via the communications network, the mobile computing device being adapted to display each of the one or more categories, a partial list of the search results for each of the one or more categories received from the search server computer, and a link for each of the one or more categories, the link being selectable to display a full list of search results for each of the one or more categories, wherein the mobile computing device is adapted to display three search results for each of the one or more categories.

2. The method of claim 1, further comprising receiving the user-provided search term from a search interface on the mobile computing device.

3. The method of claim 1, wherein retrieving search results based on the user-provided search term comprises retrieving the search results from a local database based on the user-provided search term.

4. The method of claim 1, wherein retrieving search results based on the user-provided search term comprises retrieving the search results from a remote database based on the search term.

5. The method of claim 1, wherein retrieving search results based on the user-provided search term comprises transmitting a standard query language (SQL) query based on the user-provided search term to a database.

6. The method of claim 1, wherein the one or more categories comprise one or more predefined categories created and managed by a search engine.

7. The method of claim 1, wherein the search results comprise documents stored on an intranet-accessible server, and wherein the one or more categories comprise document types associated with the documents.

8. The method of claim 7, wherein the one or more categories comprise a word processing document file type, a spreadsheet document file type, and a presentation document file type.

9. The method of claim 1, wherein the search results comprise contact information for multiple people, and wherein the one or more categories comprise a name, a phone number, and an address associated with each of the multiple people.

10. The method of claim 1, wherein the one or more categories comprise a separate external database from which the search results are retrieved.

11. A system for providing search results to a mobile computing device, comprising:
    a processing unit; and
    a memory having program modules executable on the processing unit stored thereon, the program modules comprising
    a web server application enabling communication with the mobile computing device over a network, and
    a search engine adapted to receive a user-provided search term from the mobile computing device via the web server application, retrieve search results from a database based on the user-provided search term, assign each of the search results to one or more predefined categories, and transmit the predefined categories and the assigned search results to the mobile computing device via the web server application, the mobile computing device being adapted to display the one or more predefined categories, a partial list of the search results for each of the one or more predefined categories received from the search engine, and a link for each of the one or more categories, the link being selectable to display a full list of search results for each of the one or more categories, wherein the mobile computing device is adapted to display three search results for each of the one or more categories.

12. The system of claim 11, wherein the web server application comprises an intranet web server application.

13. The system of claim 11, wherein the database comprises a local database coupled to the search engine.

14. The system of claim 11, wherein the database comprises a remote database coupled to the search engine via the web server application.

15. The system of claim 11, wherein the database comprises a plurality of remote databases coupled to the search engine via the web server application.

16. The system of claim 15, wherein the one or more predefined categories comprises a separate predefined category associated with each of the plurality of remote databases.

17. The system of claim 11, wherein the mobile computing device comprises one of a mobile phone, a smartphone, or a personal digital assistant (PDA).

18. A computer-readable storage medium not including a signal having computer-executable instructions stored thereon which, when executed by a computer, cause the computer to:
    receive, at a search server computer, a user-provided search term from a search interface provided on a mobile computing device via a communications network;

retrieve, by the search server computer, search results by querying one or more databases based on the user-provided search term;

assign, by the search server computer, each of the search results to one of a plurality of predefined categories, the plurality of predefined categories comprising multiple file types;

transmit the plurality of predefined categories and the assigned search results from the search server computer to the mobile computing device via the communications network, the mobile computing device being adapted to display the plurality of predefined categories, a partial list of the assigned search results for each of the plurality of predefined categories, and a link for each of the predefined categories, the link being selectable to display a full list of the assigned search results for each of the predefined categories, wherein the mobile computing device is adapted to display three search results for each of the one or more categories.

* * * * *